United States Patent
Baker et al.

(10) Patent No.: US 7,387,251 B2
(45) Date of Patent: Jun. 17, 2008

(54) BAR CODE RECOGNITION METHOD AND SYSTEM FOR PAPER HANDLING EQUIPMENT

(75) Inventors: Christopher A. Baker, New Canaan, CT (US); Douglas B. Quine, Bethel, CT (US)

(73) Assignee: Pitney Bowes Inc., Stamford, CT (US)

( * ) Notice: Subject to any disclaimer, the term of this patent is extended or adjusted under 35 U.S.C. 154(b) by 510 days.

(21) Appl. No.: 11/001,478

(22) Filed: Dec. 1, 2004

(65) Prior Publication Data

US 2006/0113387 A1 Jun. 1, 2006

(51) Int. Cl.
*G06K 5/04* (2006.01)
*G06K 7/10* (2006.01)
*G06K 9/00* (2006.01)
*G06K 19/06* (2006.01)
*B07C 5/00* (2006.01)

(52) U.S. Cl. .................... 235/462.12; 235/462.02; 235/462.41; 382/101; 209/584

(58) Field of Classification Search ........... 235/462.02, 235/462.12, 462.13, 462.43, 470, 462.11, 235/462.41; 382/101, 102, 183; 209/583, 209/584

See application file for complete search history.

(56) References Cited

U.S. PATENT DOCUMENTS

| | | | | |
|---|---|---|---|---|
| 5,155,344 A | * | 10/1992 | Fardeau et al. | 235/470 |
| 5,191,196 A | * | 3/1993 | Mercede et al. | 235/484 |
| 5,495,097 A | * | 2/1996 | Katz et al. | 235/462.12 |
| 5,629,511 A | * | 5/1997 | Iwaguchi et al. | 235/462.07 |
| 5,770,841 A | * | 6/1998 | Moed et al. | 235/375 |
| 6,315,201 B1 | * | 11/2001 | Reichenbach et al. | 235/462.08 |
| 6,849,860 B2 | * | 2/2005 | Gehring et al. | 235/462.01 |
| 2005/0230469 A1 | * | 10/2005 | Mondie | 235/462.02 |
| 2006/0091218 A1 | * | 5/2006 | DiCristina et al. | 235/462.14 |

FOREIGN PATENT DOCUMENTS

| | | | |
|---|---|---|---|
| GB | 1 392 623 A | * | 4/1975 |
| JP | 08-131962 A | * | 5/1996 |

OTHER PUBLICATIONS

C840.1.4, Barcoding Standards, pp. 147-152, DMM Issue 58 Updated Oct. 14, 2004.
Section 4, POSTNET Barcodes, Publication 25, Jul. 2003, pp. 37-48.

* cited by examiner

*Primary Examiner*—Jared J Fureman
(74) *Attorney, Agent, or Firm*—Christopher H. Kirkman; Steven J. Shapiro; Angelo N. Chaclas

(57) ABSTRACT

A method and system for reading various codes, such as codes imprinted on an item, includes a first and a second code reader that each scan the code on the item to read the code. The data obtained by the first and the second code reader is merged to reconstruct the code on said item. The position of the code readers may be adjusted such that the maximum reading efficiency of said code by each code reader occurs at different points of the scanned code. The method and system may be employed with different types of codes including various forms of bar codes.

21 Claims, 6 Drawing Sheets

BAR CODE RECOGNITION METHOD AND SYSTEM FOR PAPER HANDLING EQUIPMENT

FIELD OF INVENTION

The present invention relates to a bar code recognition method and system and more particularly to an enhanced bar code recognition method and system for paper handling equipment.

BACKGROUND OF THE INVENTION

Paper handling systems frequently include bar code recognition systems. These systems are often employed in mail processing equipment, such as sorters or inserters.

Posts and private carriers frequently provide discounts to mailers who presort mail. The discounts vary from country to country and are often dependent on the level of presort. In general, the more specifically the mail has been sorted in relation to delivery by the post or carrier, the greater the discount. In the United States, mail sorting equipment reduces the cost of sorting mail, which may be from $45 per thousand pieces when manually sorted, to $3 per thousand pieces when automatically sorted. Furthermore, when mailers presort mail before presentation to the United States Postal Service (USPS), the postal discounts from the full postal charge for first class mail presently provided to the mailer by USPS can be as high as 9.5 cents per mail piece.

These mail sortations implemented by the mailer, by the posts or the private carriers, often utilize a multiple pass radix sort algorithm. The United States National Institute of Standards and Technology defines a radix sort as a multiple pass distribution sort algorithm that distributes each item to a bucket according to part of the item's key, beginning with the least significant part of the key. After each pass, items are collected from the buckets, keeping the items in order, then redistributed according to the next most significant part of the key. In a mailing system radix-type sortation, the key can be the delivery point sequence number which may be accessed with reference to a ZIP code, and the bucket can be the destination sortation bin. Use of a radix sort allows mail pieces to be sorted into delivery point sequence (carrier walk sequence) and eliminates the need for the delivery person to sort the mail before delivery. However, in implementing multiple sortations of this type, to achieve a delivery point sequence requires that the ordering or layering of mail from prior sortations be maintained when mail pieces from each of the sortation bins are combined for the next sortation pass.

In processing mail, the systems may read the bar codes applied to the face of the envelope to determine the destination sortation bin for the mail piece during a particular sortation pass. In the United States, USPS POStal Numeric Encoding Technique (POSTNET) bar codes are printed on the face of the envelope and are read by the bar code reading system. The POSTNET specifications are documented in the USPS Domestic Mail Manual issue 58 in section C840 (bar coding standards for letters and flats) and in USPS Publication 25 (Designing letter mail) in chapter 4. The POSTNET bar code encodes the destination ZIP code (postal code) on the face of the mail piece and is employed for the sortation process. A problem occurs when the imprinted postal code cannot be properly read such as from a POSTNET or other bar code by the sortation equipment. In such a case, the mail piece is outsorted from the sortation run to a reject bin for manual processing. This is a very expensive cost in processing mail. It is particularly problematic because of the requirement for maintaining the careful layering of the mail in for multipass sequence sorts.

This required layering for multipass sequencing is not maintained with respect to the outsorted mail piece. Accordingly, the outsorted mail piece loses its place in the sortation process and must be manually placed in the appropriate sequence if multipass sortation sequencing is to be maintained. The problem may be further compounded since typically a very small time window exists before the next batch of mail is processed for a different delivery area. These problems reduce the mailing handling system productivity and throughput.

Prior attempts to deal with the problem of the bar code reader being unable to accurately read the imprinted code on the mail piece have provided plural bar code readers from different vendors. Since it is known that rejected or unread mail is often properly read when submitted to different readers, in the hope that if one of the bar code readers cannot completely recover a bar code imprinted on a media item, the other bar code reader type would be able to make the full read. The subsequent bar code reader provides another opportunity for a correct read of the imprinted bar code on the mail piece. If any of these bar code readers provide a complete and proper reading of the bar code, the mail piece is not outsorted to a reject bin and is included in the sortation process.

Prior art systems also rerun unread pieces in the system, while the pieces often read on the second attempt by the same reader, these pieces may have lost their sequence position within the multipass sort and therefore may not gain the full benefit of the sortation process. Each pass is a stand alone event, either the bar code read reads the bar code or it does not.

Additionally, the error recovery capability within the USPS POSTNET bar code as explained in the above-noted USPS publications, has been employed to obtain a valid ZIP code from a partially read code. POSTNET encodes each ZIP digit in a cluster of 5 bars (two of which are long and three of which are short). If this requirement is not met, then the digit cluster is known to be corrupted. The modulo 10 check digit (last digit) may then be used to recover a single missing ZIP code digit. It has sometimes been possible to recover two digits in some limited instances. Such recovery has been within a single read of a single POSTNET bar code where two different clusters of five bars (each cluster encoding a numerical digit) are corrupted if there is only one unique possible solution compatible with the known data. Recovery has been by means of a use of a lookup table of possible cluster combinations that provide the solution and are consistent with the check sum data.

Inexpensive tracing and tracking of mail is a feature requested by many postal customers. The USPS developed the PostaL Alpha Numeric Encoding Technique (PLANET) bar code to enable tracing and tracking of mail pieces by providing a unique identifier for each mailing. In combination with the POSTNET bar code identifying the destination, PLANET bar codes make it possible to uniquely identify each mail piece. The encoding scheme is the complement of the POSTNET encoding scheme (three tall bars and two short bars in each cluster of five). Thus, the same bar code reader can operate to read both POSTNET and PLANET bar codes. At the same time, the different symbology conventions make it possible to distinguish the two bar codes (mostly tall vs. mostly short bars). Error correction principles associated with POSTNET codes also apply to PLANET codes. With the use of both the POSTNET and PLANET bar codes, the mail piece is uniquely defined only by the combination of the two bar codes, either code alone is typically insufficient. However, if each of plural bar codes, for example, a POSTNET and a PLANET code, are read with a certain probability, the probability of all bar codes being read is the product of the individual probabilities. The need to read both codes reduces the probability of a full correct reading of the entire bar coding on a mail piece. Thus a 95% read probability of a single bar code will become a 90% probability (0.95*0.95) of reading two bar codes or an 86% probability of reading three.

SUMMARY OF THE INVENTION

It has been discovered that partial information obtained from two or more code readers can be combined to reconstruct the valid code or codes of the same or different types on an item, such as a mail piece. It has been further discovered that even if the combined partial information from the code readers are not sufficient to determine the valid code or codes, even when error correcting information from the code itself is employed, the partial combine information can be further combined with information from an optical character recognition (OCR) system reading the information on the media item or from a mail data file. The partial information recovered from the code readers can be further utilized to help target the OCR system to obtain the missing portion of the information in the combined data obtained by the code readers. The partial information recovered from the code readers or OCR can also be used to locate the missing information from a mail run data file of the mail being processed or from a general address data base.

It has further been discovered that the code readers such as bar code readers can be mounted with respect to each other such that better read regions of one reader are positioned in the worse read positions of another reader. This enables enhancement of the reading rates by the code reader when the data from each code reader is combined and further offsets the further impact of beat frequency degradation which may occur due, for example, to the interaction of moving a bar code past the a bar code reader and the rate at which the bar code reader is energized to image the bar code.

The present invention provides an arrangement for code reading which greatly enhances the capability to recover single or plural imprinted codes on a media item or other type of item by combining partial information from plural code readers, with or without optical character recognition or other enhancement, and by positioning the code readers such that the missing information and the data recovered by each code reader is at different part of the code. The codes can be the same or different types of codes such as POSTNET and PLANET type codes. Controlling the position of two or more code readers such as bar code readers with respect to each other enables the failure points in the code reading to be at different locations in the code(s) so that the combined recovered data enables the actual, valid imprinted code(s) to be reconstructed and utilized in the processing of the media item. The present invention is especially useful in the case of multiple codes, such as bar codes, being read from the same item.

A method for reading bar codes imprinted on an item embodying the present invention includes a first and a second code reader each scanning the code on the item to read the code. The data obtained by the first and the second code reader is merged to reconstruct the code on the item.

In accordance with a feature of the present invention, the first and the second bar code reader are positioned such that the maximum reading efficiency of the bar code to occur at different parts of the scanned bar code to facilitate the merging the data obtained by the first and the second bar code reader to reconstruct said bar code on the item.

In accordance with another feature of the present invention, the first and the second code reader are positioned such that degradation in reading the code occur at different parts of the scanned code to facilitate the merging the data obtained by the first and the second code reader to reconstruct the code on the item.

In accordance with yet another feature of the present invention, the code data is representative of information on the item. The item information is imaged. The data obtained by the first and the second code reader is combined with the imaging data obtained from imaging the item information to reconstruct the code on said item.

A paper handling system embodying the present invention for mail pieces having an imprinted bar code includes a computer and a mail piece transport. A first bar code reader and a second bar code reader are each connected to the computer and are mounted on said mail piece transport. The transport moves mail pieces past the first bar code reader and the second bar code reader. Each reader is operable to scan transported mail pieces to obtain bar code data for each mail piece bar code. Each reader is also operable to communicate obtained bar code data to the computer. The computer merges the data obtained by the first and the second bar code reader to reconstruct the bar code on a mail piece.

In accordance with a feature of the invention, the first and the second bar code reader are mounted on said transport such that the distance between said bar code readers is adjustable.

In accordance with another feature of the invention, the first and the second bar code reader are mounted on said transport such that the angular orientation between said bar code readers is adjustable.

BRIEF DESCRIPTION OF THE DRAWINGS

Reference is now made to the figures wherein like reference numerals designate similar items in the various figures and in which.

DETAILED DESCRIPTION OF THE PREFERRED EMBODIMENT

Figure 1:
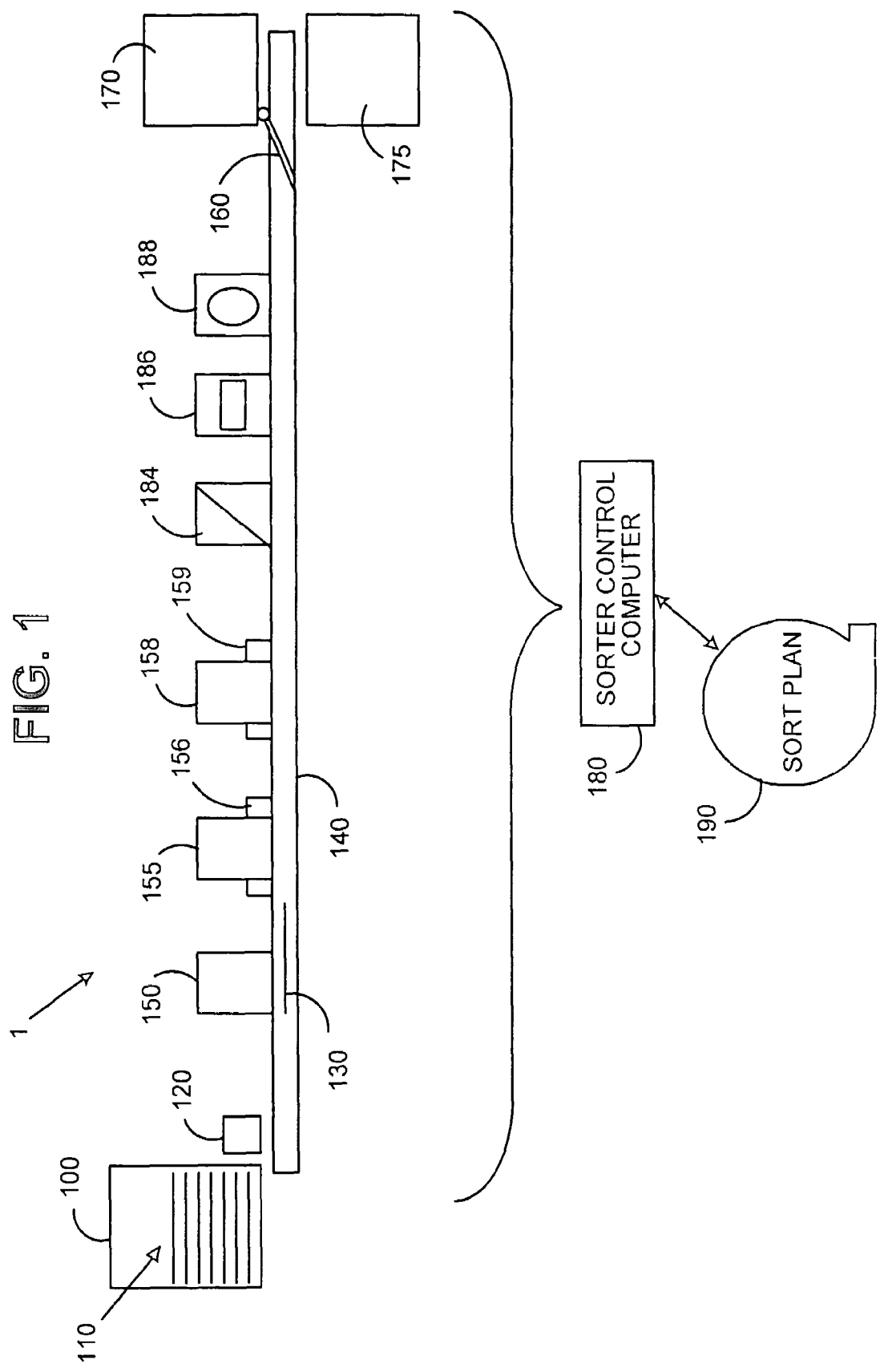
FIG. 1 is a diagrammatic view of a mail piece sorter system employing a bar code reading arrangement embodying the present invention.

Reference is now made to FIG. 1. A mail piece sorter system 1 includes a mail piece magazine 100, including a stack of mail pieces shown generally at 110. A mail piece feeder 120 feeds individual mail pieces out of the mail piece magazine 100 onto the sorter transport 140. A first bar code reader 150 is mounted along the sorter transport path and reads bar codes printed on passing mail pieces, such as mail piece 130. The sorter control computer 180 controls the operation of the sorter system and utilizes a sort plan database 190, which depends on bar code data (in the form of a ZIP or postal code) obtained from the mail piece to determine the proper sortation bin for the scanned mail piece. The ZIP code data obtained from the scanned mail piece 130 when provided to the sorter control computer 180 with reference to the sort plan database 190, causes sortation bin 170 diverter 160 to be deployed. Deployed diverter 160 guides the mail piece 130 into the sortation bin 170 as the mail piece is moved along transport 140. The bar code data is obtained from the scanned mail piece 130 by bar code reader 150 and, as will be explained hereinafter, by the operation of other bar code readers mounted along the sorter transport path. The operation of these bar code readers is further enhanced, if desired, by optical character recognition (OCR) devices and/or a mail data file lookup.

If the bar code reader 150 fails to successfully recover the bar code data on mail piece 130, the mail piece would not be rejected and would not be moved into a reject sortation bin. A second bar code reader 155 and a third bar code reader 158 provides a second and a third opportunity to recover bar code data on the mail piece 130 and extract the needed data as explained hereinafter. Bar code reader adjustment devices 156 and 159 allow the position of bar code readers 155 and 158, respectively, to be shifted closer to or further from the fixed bar code reader 150 and also to change the angular orientation of the bar code readers. The bar code reader position adjustments will be small and depend upon interactions between the bar code reader scan resolution, bar code dimensions, and the transport speed. For a POSTNET bar code in a typical sorter application, the range of adjustment is likely to be a few millimeters. The adjustment can be by any known means, as for example, by a vernier adjustment or by an automated adjustment. The adjustment enables the position of each of the bar code readers 155 and 158 to be adjusted with respect to bar code reader 150 to differentiate the portion of the mail piece bar code where successful data recovery is maximized for each reader so the total system data recovery performance is maximized.

Since the bar code on the mail piece is being read by each bar code reader, a beat frequency occurs due to the interaction of the movement of the mail piece, and thus the fixed spaced bars of the bar code being scanned, and the frequency at which each of the bar code reader samples the mail piece bar code. POSTNET specifications call for bars to be printed at 20 to 24 bars per inch with a bar width of 0.015 inch to 0.025 inch and spaces between bars of 0.012 inch minimum to 0.04 inch maximum (USPS publication 25, chapter 4). As an example a situation can involve the case in which bars are printed at 22 bars per inch with a width of 0.015 inches, the transport speed is 160 inches per second, and a bar code reader is scanning at 100 lines per inch. Since the line scan rate is not an exact multiple of the bar code print rate, some scans will align directly on top of the printed bars while others will image the edge of the bar and a portion of the space between bars resulting in a weaker image. Since imaging systems binarize (convert to black and white without gray levels) or gray scale (assigned fixed darkness levels) the image pixels, weak image pixels can be lost and noise can be introduced. A continuous series of bars images in such a system on various background materials with actual print quality will therefore show some bars that are relatively broad and others that are relative narrow or even missing. The cycle of reinforced and reduced read quality across the bar code is related to the interactions of the scan rate and the transport speed; there may be several such quality cycles across the length of a single bar code. While higher scan rates reduce the problem by obtaining scans within bars, such systems increase hardware, lighting, and processing costs and still do not achieve 100% read rates.

Even if multiple rereads attempts did not have a significant impact upon sort accuracy, productivity, and costs, problems may still be encountered. First, very small shifts in registration between the document and the scanner make substantial shifts in the optional bar code read locations. There is no way to systematically shift the registration on subsequent read attempts, the registration in most cases is essentially random. Secondly, there is no assurance that it will be possible to link fragmentary data across multiple read attempts. With the present arrangement, the fixed spacing between the two (or more) readers is designed to ensure that they have two different registrations with respect to the bar code and therefore provide different views of the scanned bar code. Additionally, since they are both referencing the same piece, any fragmentary information gleaned from one may be used in support of data from the other.

As a mail piece, such as mail piece 130, passes by the bar code readers 150, 155 and 158, each of the bar code readers obtains whatever data it can read from the mail piece. When the data from each of the bar code readers is combined in the sort control computer 180, or elsewhere in the sorter system, if further information is missing to provide a complete reading of the mail piece bar code data, an optical character recognition system 184 may be employed to obtain the missing information from the optical character information on the mail piece. The inclusion of an optical character recognition system is optional. The optical character recognition system further enhances the reading rate from that provided by one or more bar code readers or by the combined data as described hereinafter from the three bar code readers 150, 155 and 158. Another optional enhancement to the reading rate is to use the combined partially recovered data by the bar code readers, when sufficient, to go to a mail data file to obtain the missing information. The data file may be a mail data file of the mail run or a general mail address data base.

A label dispenser 186 and an inkjet printer 188 may be provided along the transport path to apply a label which covers the existing poor quality imprinted bar code on the mail piece and on which a new bar code is imprinted by the inkjet printer 188. This may be employed to facilitate subsequent bar code reading when the bar code reading on a mail piece is difficult to recover. Finally, the mail piece is moved into the appropriate sortation bin 170 or 175, as shown in FIG. 1, based on the information recovered from the bar code.

The movement of the two bar code readers 155 and 158 with respect to bar code reader 150 ensures that the aliasing (sampling) errors are different for each of the three readers. Because the bars in the POSTNET bar code are evenly spaced (nominally 22 per inch), the beat frequency between the sampling rate of the reader and the moving mail piece bar codes causes certain bars (especially when they are thin)

to be imaged or seen strongly in at least one of the bar code readers, even though it almost disappears in another of the bar code readers. By spacing the bar code reader such that the worst read position on one of the bar code readers is the best position on another of the bar code reader, the combination of the bar code readers can provide a greatly enhanced reading combination. This can be combined with the error correction capability inherent in the bar code, such as a POSTNET bar code and also in conjunction with optical character recognition. However, due to the current cost of optical character recognition systems, it may be desired to employ this additional functionality in high value bar code reading applications.

It should be noted that the angle of the bar code reader with respect to the mail piece is also a variable in bar code readability. Tilted mail pieces usually have poor read rates. Since transport mechanical systems are imperfect, envelopes display a range of orientations as they pass down the track. It may therefore be helpful to tilt one or more bar code readers to enable them to better read a range of skew angles if they do not already contain effective automatic image rotation software in their processing subsystems. While nominally mail sorter systems process mail in a fixed orientation to the deck, if a particular system is found to have a consistent skew bias, it may be desirable to rotate the reference bar code reader 150 and for the other readers to be positioned to extend the tolerance of rotation using test decks with preprinted rotated test bar codes. For example, in such a case it might be observed that bar codes were typically rotated 8° and that the best system read rates were obtained when bar code readers were positioned with skew angles of 5° and 11°.

It should be noted that optical character readers that sample data can also employ the aspects of this invention by providing two or more cameras which are positioned with respect to each other to maximize the combined readings so that portions that cannot be read with one optical character recognition system can be read by an other optical character recognition system. This reduces character substitution errors with the plural inputs, which for certain applications may be further enhanced with spell checker functionality.

Figure 2:
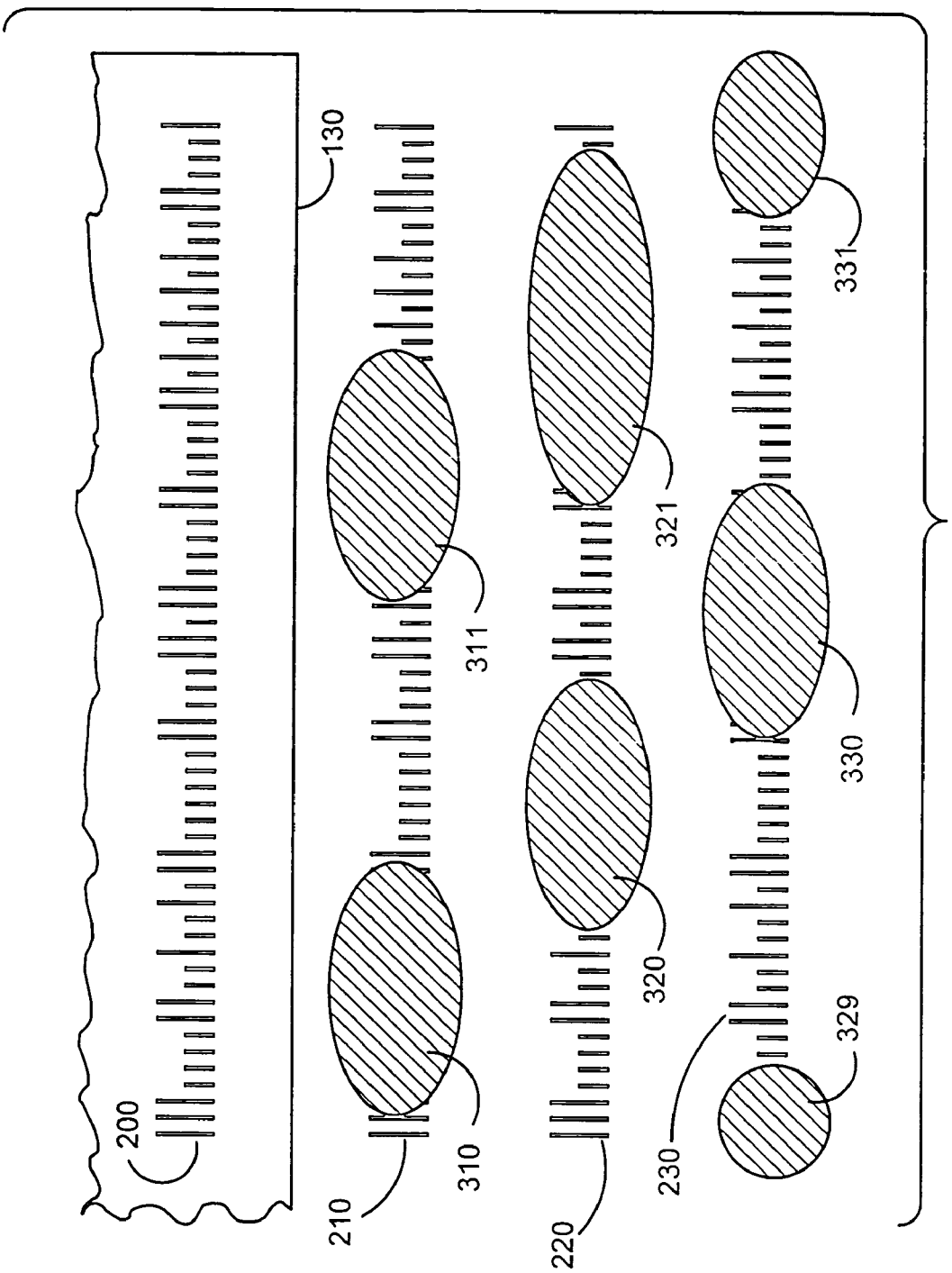
FIG. 2 is a view of a mail piece having a POSTNET bar code imprinted thereon and representations of the bar code data from each of the three bar code readers shown in FIG. 1, helpful in understanding the present invention.

Reference is now made to FIG. 2. A POSTNET bar code 200 is shown on a portion of mail piece 130. The POSTNET bar code is a graphic method of encoding the USPS 11 digit destination ZIP code information. It is this POSTNET delivery point bar code on a letter or flat sized mail piece that enables the USPS to sort mail pieces in the sequence that the mail delivery person will walk a delivery route.

The POSTNET bar code 200 on mail piece 130 represents the delivery point destination address for the mail piece. The result of both imperfect printing of the bar code and also the imperfect imaging of the bar code results in a percentage of the bar codes scanned by a bar code reader being unsuccessful. Such instances where the bar code scan is unsuccessful are illustrated for: bar code scan 210 with defects 310 and 311, which is obtained from bar code reader 150; bar code 220 with defects 320 and 321 obtained by bar code reader 155; and, bar code 230 with defects located at 329, 330 and 331 obtained by bar code reader 158. Bar code scans 210, 220 and 230 are all scans of the same bar code 200, however, each contains defects in the scanned bar codes at different locations. This is due to the positioning of adjustable bar code readers 155 and 158 in relation to the fixed bar code reader 150. It should be noted that all of the bar code readers can be adjustable and the combination of adjustable and fixed bar code readers may depend on the particular implementation of the apparatus.

Thus, as shown in FIG. 2, when bar code reader 150 images the mail piece 130 and captures the scan 210, it will be unable to decode the bar code because the defect 310 and 311 are too large to recover using the error correction code inherent in the POSTNET bar code. Likewise, if bar code 155 images mail piece 130 and captures the scan 220, it also will be unable to decode the bar code because the defects 320 and 321 are too large to recover. In like manner, bar code reader 158 cannot successfully read and decode scan 230 because of the size of the defects 329, 330 and 331. However, the combination of the three image scans 210, 220 and 230, of bar code 200 contain sufficient data to successfully reconstruct the bar code on mail piece 130. In such an arrangement, during operation of the sorter system 1, if the data is combined the POSTNET bar code will be successfully reconstructed and the mail piece can be moved into the appropriate sortation bin 170 or 175, as the case may be. This avoids the need to sort the mail piece into a reject sortation bin. Where the three bar code readers scans, when combined, still do not contain sufficient data to reconstruct the bar code 200, additional information can be obtained from the OCR system 184. Moreover, the missing bar code data from the combined scan can be used with the OCR system to obtain the missing information. This may be, for example, the street address or the city or the state or other specific information on the mail piece address. As previously noted additional information may also be obtained from a mail data file.

In this instance, a mail piece which could not be read successfully but for which some fragment of information could be obtained with the bar code reader or OCR (a unique section of a bar code, a customer surname, an unusual street name, an account number) could be identified by reference back to the customer data files or the Mail Run Data File (MRDF) which generated the mailing. If an unusual name is recognized or a more common name is recognized in combination with a street name, the unique mail piece corresponding to that information may be identified in the MRDF. A label may be applied to cover the old defective bar code, the bar code for the destination address may be reprinted on the opaque label, and the envelope sorted properly. On subsequent passes through this or other automation equipment, the new bar code may be reliably read.

Figure 3:
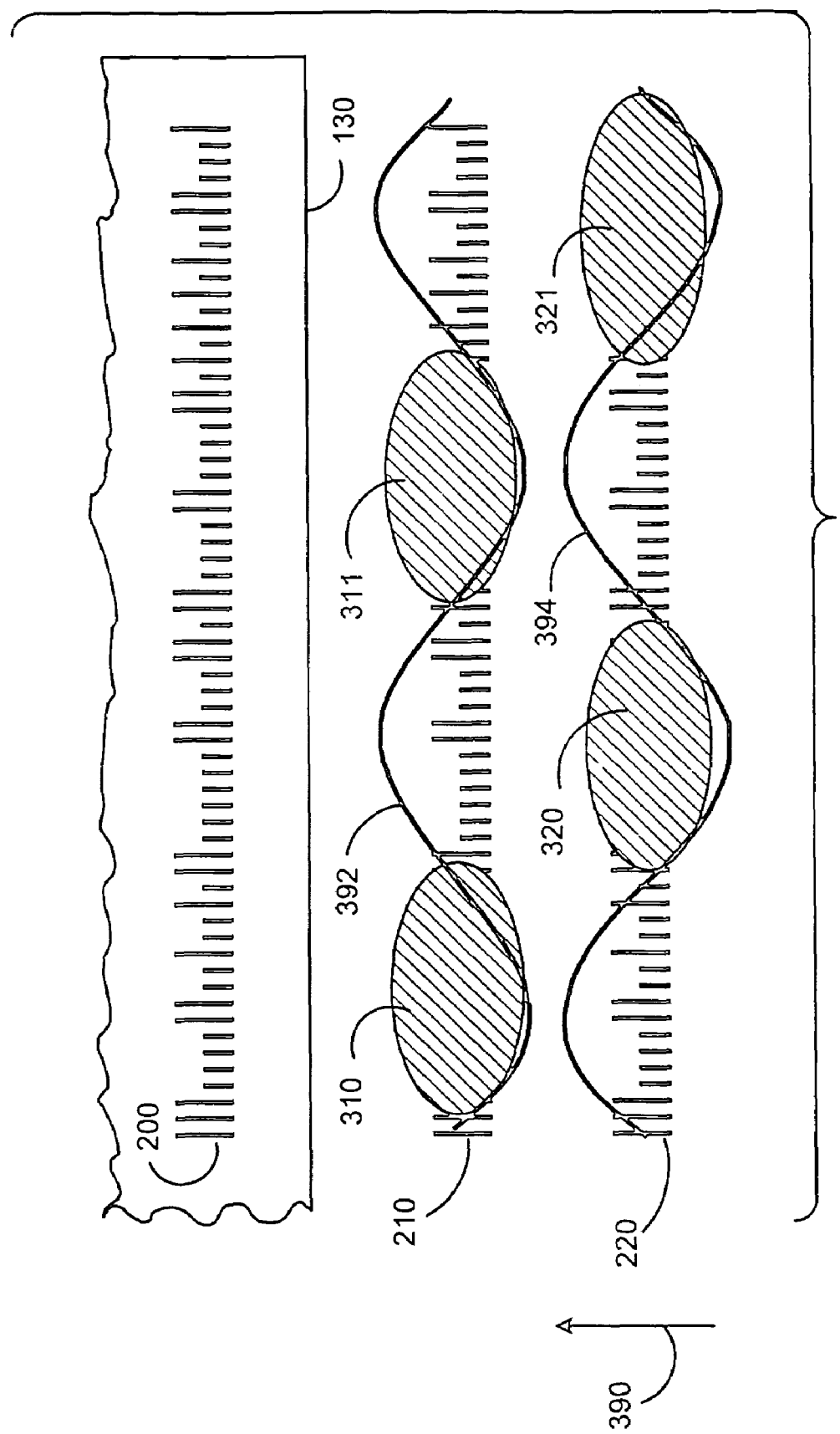
FIG. 3 is a view of a bar code imprinted on a mail piece and the information data recovered by a two bar code reader system, with an overlay curve showing the effectiveness of each of the readers, helpful in understanding aspects of the present invention.

Reference is now made to FIG. 3. For clarity, only two bar code scans 210 and 220 are illustrated for the arrangement in which the sorter system is operated with only two bar code readers, such as bar code reader 150 and bar code reader 155. The superimposed heavy lines 392 and 394 are a graphical depiction illustrating the quality of the read of each of the bar code readers 150 and 155 across the bar code, with the arrow 390 indicating the graphical direction of highest read quality. For each of the bar codes, the points of lowest read quality are at the read defect 310 and 311 for bar code scan 210, and 320 and 321 for bar code scan 220. Thus, through adjustment of the position of the bar code reader 155 in relation to bar code reader 150, the phase of the cyclical read quality curves are offset by 180° for the two readers 150 and 155. In the case of three readers, the theoretical phase shift offset adjustment would be 120° and for four readers the theoretical phase shift offset adjustment would be 90°. In this manner, it is possible to best utilize each additional reader to further enhance the effectiveness of the combined bar code scanning. The exact phase shift offset is not critical and need not be achieved in operations. These calculations are presented simply to provide calibration guidance: in a 2 reader system, phase offsets close to 0° would generally be predicted to obtain the least benefit from dual bar code readers while phase offsets close to 180° would generally be predicted to obtain the most benefit from dual bar code readers. In contrast, multiple read passes of an envelope with a single reader could only achieve this result randomly and would also require careful tracking of the fragmentary data from each of the multiple passes. However, such tracking would be particularly difficult since there is no means to identify each of the multiple scans of the envelopes as originating from the same mail piece so that the fragmentary data can be stitched together. If bar code data were available to identify the envelope, then there would likely be no need to recover the data.

As observed earlier, the registration of the envelope with respect to the bar code reader is not precisely controlled by the feeder 120 and therefore the phase of the quality cycle shown in FIG. 3 will vary from one pass to another of the same envelope passing the same reader. However, the distance between the readers in a run is fixed and therefore once they are positioned to provide different read phases, that difference will persist as volumes of mail are processed. [Since the mail piece is moving across the bar code reader scan window, positions across the bar code correspond to different read times.]

Figure 4:
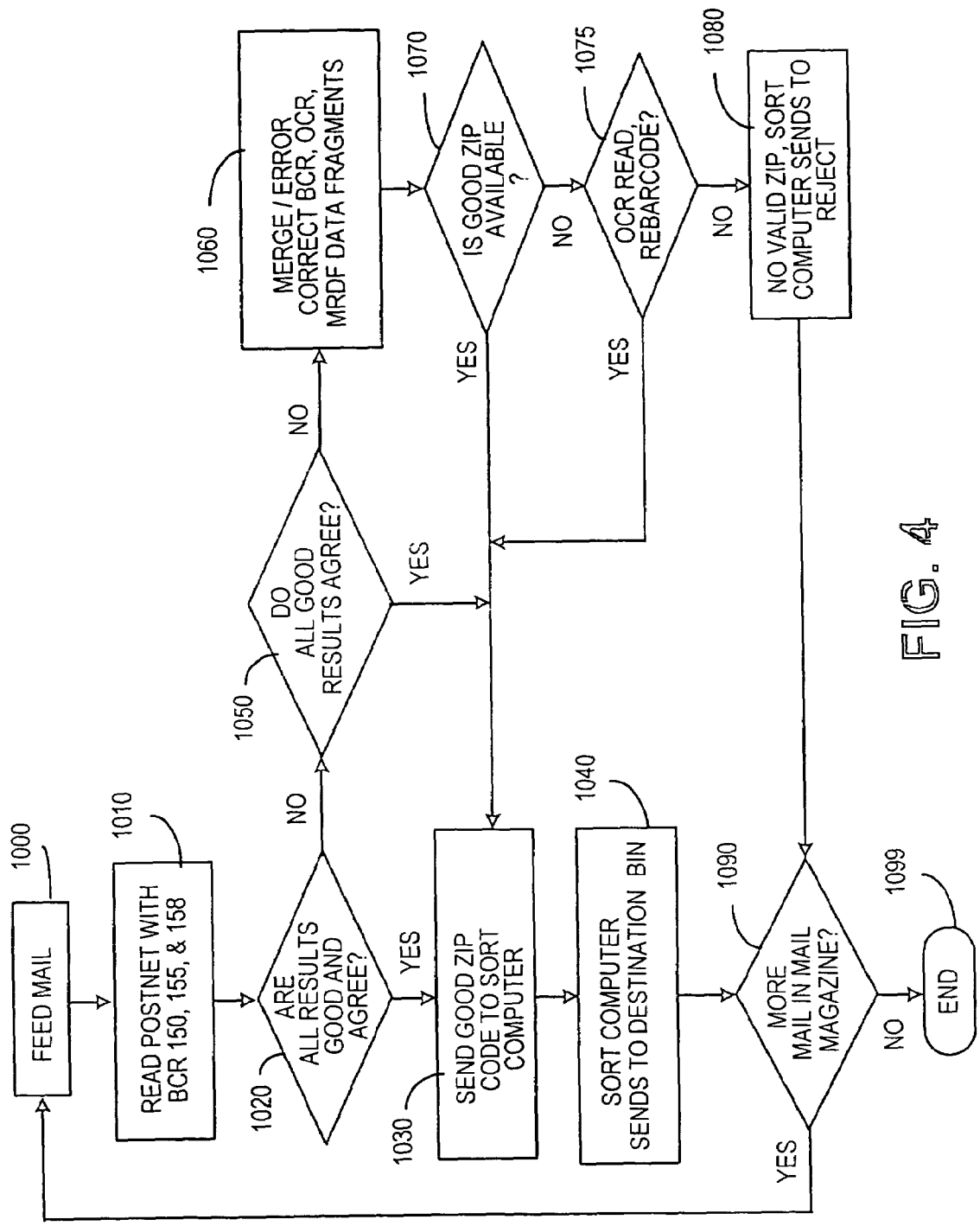
FIG. 4 is a flow chart of the operation of the bar code readers and optical character recognition (OCR) system shown in FIG. 1.

Reference is now made to FIG. 4. At 1000, mail is fed onto the sorter transport and at 1010 the POSTNET bar code or other similar code printed on the mail piece is sequentially scanned and read by bar code readers 150, 155 and 158. A decision is made at 1020 whether all of the results of the three bar code readers are good and if the scan from the three bar code readers all agree. If this is the case, at 1030 the decoded ZIP code from the POSTNET bar code is sent to the sorter computer 180. Based on the ZIP code at 1040, the sorter computer 180 deploys the appropriate diverter, which moves the mail piece into the destination sortation bin. At 1090, a determination is made if more mail is in the mail magazine. If this is the case, the process loops back to block 1000 and repeats.

If at 1020 all of the results are not good and the scans from the three readers do not agree, the process continues at decision block 1050. At 1050 a determination is made if all of the good results agree. That is, the same the complete bar code data is recovered by the scan of each of the successful bar code readers (unsuccessful reads by other readers are not considered). If this is the case, the process continues at block 1030. However, if all of the good results do not agree, the data obtained from all bar code readers are merged at 1060 and, to the extent possible, the POSTNET bar code error correction check digits and raw bar data from the bar code readers are employed to further correct the fragments. A determination is made at 1070 whether the merge and correction of the fragments resulted in a good ZIP code being decoded from the merged and error corrected data. If this is the case, the process continues at 1030. However, if the merged corrected data fragments still do not provide a good ZIP code, at 1075 data captured from the address on the face of the envelope by the optical character recognition system and is merged with the merged and corrected bar code data fragments. If desired, a reprint of the recovered bar code may be implemented on the mail piece.

If the process at 1075 is successful, the process continues at 1030. On the other hand, if both the optical character recognition information along with the data from the merged and error corrected data fragments are not sufficient to decode a good ZIP code, the process continues at 1080 where no valid ZIP code is uncovered and the sort computer 180 sends the mail piece to the reject sortation bin. At that point in time, the process continues to decision block 1090.

At 1090, when no more mail is in the mail magazine, the process ends at 1099.

The merging of scanned POSTNET data fragments and error correction of the bar code involves data that is gathered from all available bar code readers. This may include both raw bar code data (individual bars) and also decoded digit data (each digit derived from five bars). It should be understood that if complete bar code data is not available, then all of the required remaining process steps using the fragmented available data will be employed. As part of this process, an attempt is made to align corresponding fragments of the three candidate data sets from the three bar code readers. Between these three data sets, a composite valid bar code may be obtained, which was not available from any one reader. Bar code level data may also be used and the corresponding digit determined. While a bar code reader may be missing bars associated with the specific digit, they can be reconstructed in the composite from the data obtained from the three bar code readers. The two of five tall POSTNET error correction specifications makes it possible to determine which cluster is corrupt for each row. Additionally, the POSTNET check sum may be employed to recover any digit that is missing across all ZIP code candidates. An OCR system may be invoked to obtain text from the mail piece face to provide missing data, which can resolve missing data.

Figure 5:
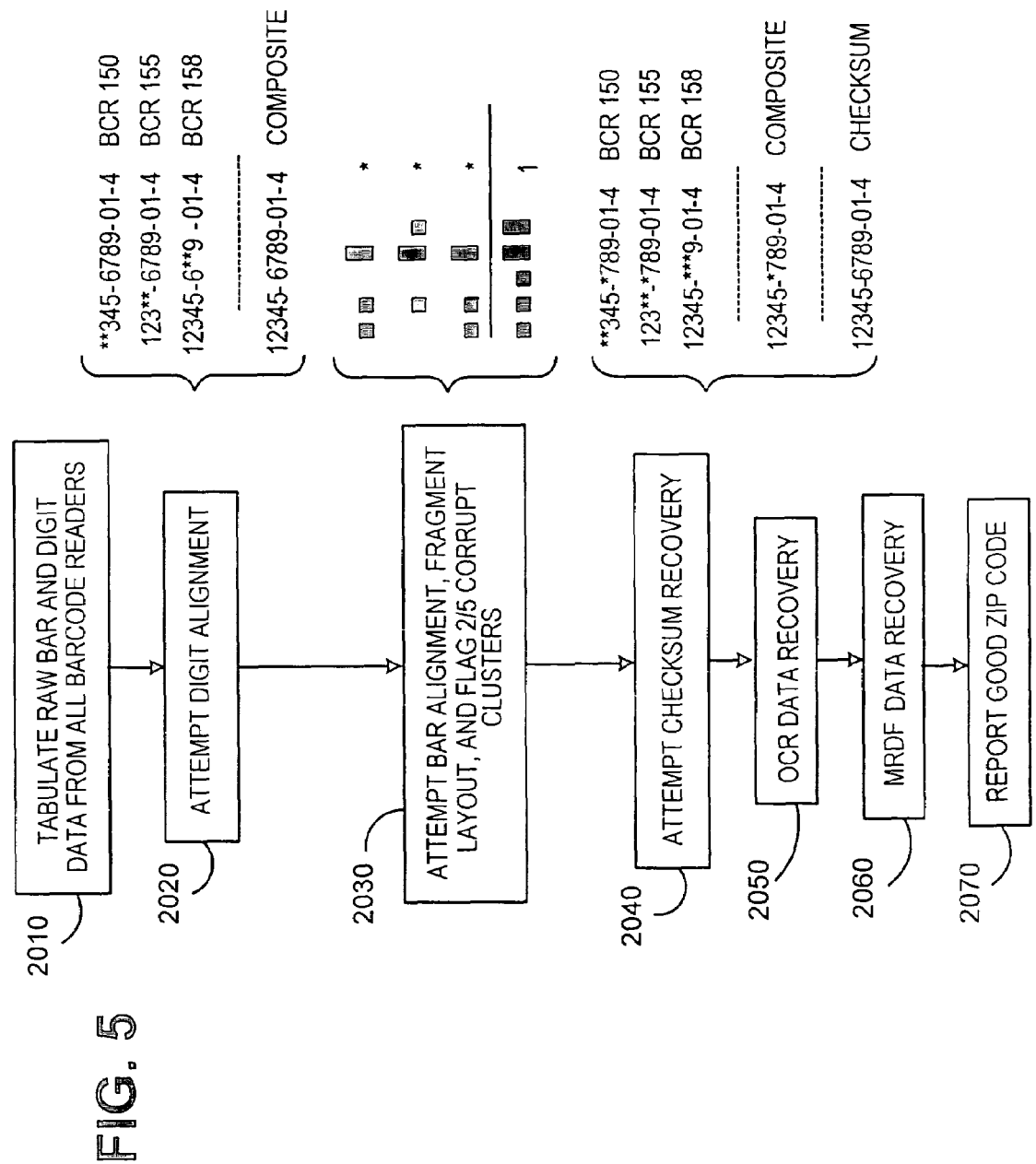
FIG. 5 is a flow chart of the merge and error correction process involving the bar code readers and optical character reader shown in FIG. 1.

Reference is now made to FIG. 5. FIG. 5 shows the process for merging and error correcting the data fragments read by bar code reader 150, 155 and 158, which occurs in block 1060 as shown in FIG. 4, along with the process of optical character recognition as a further enhancement to recover the correct POSTNET bar code, which occurs in block 1075 as shown in FIG. 4.

At 2010, the raw bar code and digit data from all the bar code readers are tabulated. At 2020, digital alignment of the data is attempted, as illustrated in the bracketed illustration to the right of box 2020. As can be seen in this bracketed illustration, bar code reader 150 provides fragmented ZIP code data where the first two digits of the ZIP code are missing, bar code reader 155 provides fragmented ZIP code data where the fourth and fifth digits of the ZIP code are missing, and bar code reader 158 provides fragmented ZIP code data where the seventh and eighth digit of the bar code reader data is missing. An asterisk denotes the missing data. Based on a merger of the data from the three bar code readers 150, 155 and 158, a reconstructed valid ZIP code is obtained.

Where the same digit from each of the three bar code readers is defective at 2030, a bar alignment attempt is made of the POSTNET bar code fragmented data using the inherent logic in the POSTNET bar code to recover the specific missing digit. The POSTNET bar code bar layout is processed and the flag of the two/five clusters is implemented to recover the specific data. Thus, the five bar, two long, three short bar clusters for each single digit of the POSTNET bar code is processed and merged from the three bar code readers to attempt to recover the missing digit. Where the above processes still fail to recover a good ZIP code, at 2040 a check sum recovery attempt is made if only one digit from the ZIP code is missing. Such as, as shown in the data next to block 2040, the sixth digit of the composite data is missing and is recovered by employment of the ZIP code check sum employed by the POSTNET bar code system. Where none of the above processes are sufficient to recover the ZIP code, OCR data recovery may be implemented at 2050. This data obtained by the OCR system 184 from the face of the mail piece may be added to the recovered fragmented bar code reader data to provide a good ZIP code. Finally, when OCR data or bar code reader fragments are obtained, it may be possible to use this information to check in the Mail Run Data File for that mailing at 2060. If a unique mail piece, such as using a mail piece number is captured by the bar code readers and can be associated with that data, then the destination ZIP code may be determined. If any of the processes in FIG. 5 have resulted in successful data recovery, then a good ZIP code will be reported at 2070.

While FIG. 5 shows a particular order of the check sum, digit alignment, bar alignment, OCR, and MRDF data recovery steps, it should be appreciated that the order and the inclusion or exclusion of specific steps may be adapted to particular situations. These steps may be utilized or not, they may be operated in parallel or serial fashion, and other data applications may warrant the inclusion of additional data elements or combinations. It should also be recognized the item may have plural codes which are each separately scanned and each separately reconstructed. Thus, for example, a mail piece may have both a POSTNET bar code and also a PLANET bar code. Each code would be scanned by the readers and each code would be reconstructed by merging of date from the two or more readers.

Figure 6:
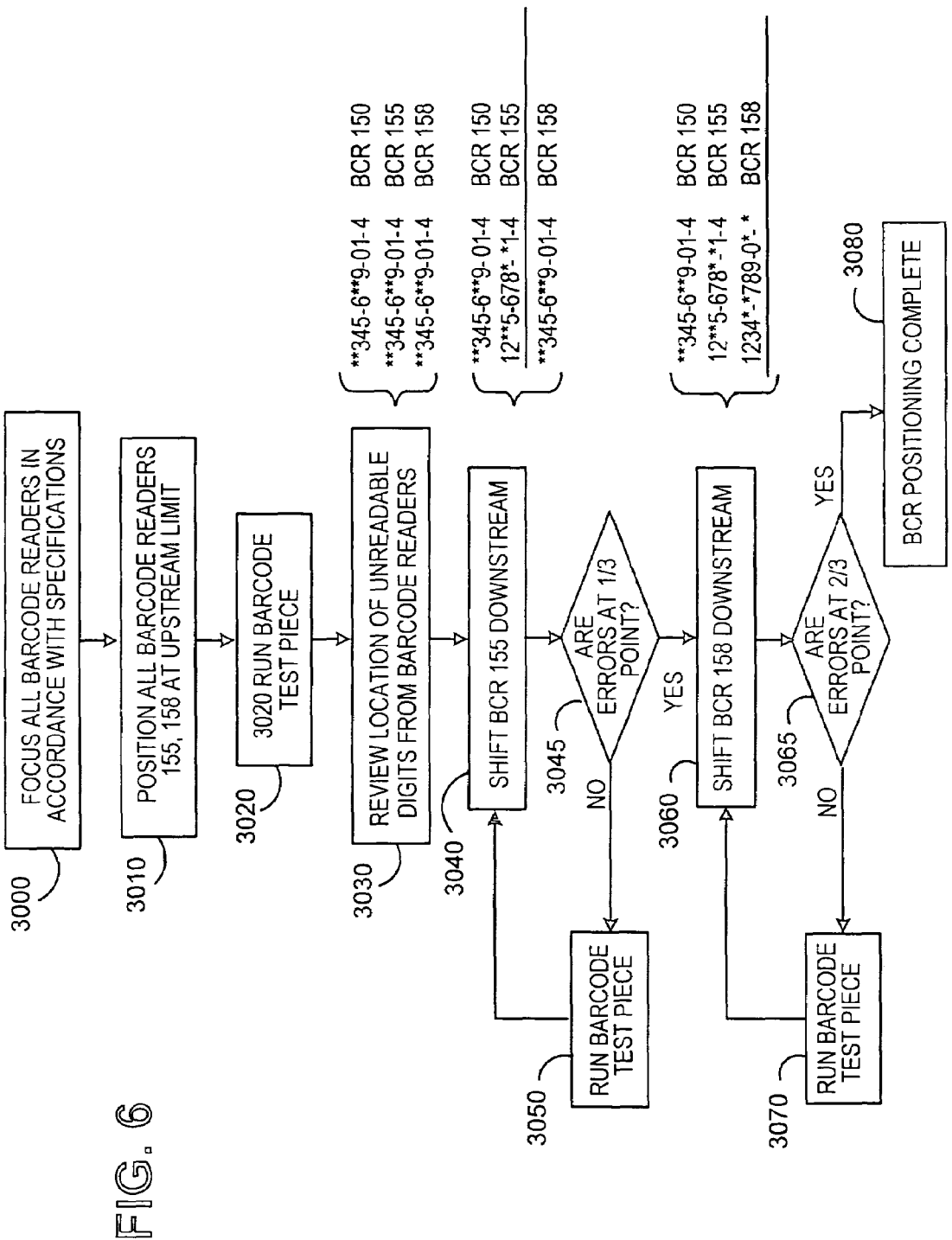
FIG. 6 is a flow chart showing the process for positioning the bar code readers when initially setting up the equipment to facilitate bar code recognition by the system.

Reference is now made to FIG. 6, which is a flowchart illustrating the process of setting the position of the bar code readers 155 and 158 on the sorter transport 140. At 3000, the bar code readers 155 and 158 are each focused in preparation of their positioning along the track. At 3010, the bar code readers 155 and 158 (if present) are moved to the upstream limits of their position to start the process. From this point, adjustments are directed downstream. It should be recognized, however, that the direction of adjustment is a matter of design choice and many adjustment arrangements can be implemented.

A test bar coded mail piece is run at 3020 and 3030, and the locations of the bar code reader scan problems are noted on the bar code. This is illustrated in the bracketed information provided to the right of block 3030. In the illustrated information, all three bar code scans have same pattern of read voids at digits one, two, seven and eight. At 3040, bar code reader 155 is shifted downstream and the bar code mail piece is again run. This process is repeated at 3050 until the voids are one-third the way (decision point at 3045) between the voids seen on the bar code scan by bar code reader 150. If desired, the test bar coded mail piece may employ thin bars to facilitate adjustment by exaggerating the effects of changing the position of the bar code reader.

At 3060, the process is repeated for the bar code reader 158 until the bar code scan voids from data obtained by bar code reader 158 are two-thirds the way (decision point at 3065) between the voids of the scan of the test mail piece by bar code reader 150. This process is repeated at 3070 in the manner noted above. This process of reading, adjusting and shifting bar code reader may be implemented manually or it may be implemented using an automated feedback loop. If the bar code readers reach the end of their available motion, they may be shifted upstream incrementally until they are properly located.

The flow chart shown in FIG. 6 illustrates the positioning of two bar code readers 155 and 158 with respect to a fixed bar code reader 150. If the system uses only two bar code readers, then references to bar code reader 158, for example, are skipped and bar code reader 155 scan voids are positioned to be mid-point of the bar code reader 150 scan voids and not the one-third point. It should be understood that the adjustment technique would be modified to accommodate the number of bar code readers and the position with respect to each other. It should also be noted that the system can employ plural optical character recognition devices which can also positioned with respect to each other such that the optical character read error correction problems are such that the combined information will provide the needed data. Further, it should be recognized that the various systems and methods described above in connection with the figures may be employed with any media item or other item to be processed that are suitable for bearing bar codes and of various types. While the invention has been described in connection with imprinting POSTNET bar codes on mail pieces and decoding destination ZIP codes, as used in the United States, other singular or plural bar codes and other coding technology and systems can be usefully employed with the present invention including reading text, images, magnetic, electronic, or radio frequency identification (RFID) data from items.

The same approach illustrated in FIG. 6 may be utilized if the system is being set for skew. Test pieces with various skew angles can be processed and the system set to read one range of skew angles using one bar code reader and another range of skew angles with another bar code reader.

While the present invention has been described in connection with USPS POSTNET bar codes, the utility of this invention extends to other bar code types and applications. The invention may be employed with any type of item and any type of scanned code. USPS PLANET codes, and others, are utilized for document tracing and tracking and may co-exist with POSTNET bar codes. The invention may be used to read and recover multiple simultaneous bar codes in multiple symbologies. Variable width bar codes encode data in the width of the bars rather than in their height. Variable width bar codes are used in the Universal Product Code (UPC) bar codes on items offered for sale. The present invention can improve the read rate of such bar codes, especially when it is not possible to made multiple read attempts with a single scanner (as is done at the grocery store). The present invention would allow improved reading of such bar codes on mail pieces since the mechanical design of the transport and requirements for support and control of the mail piece only allows a portion of the bar code to be visible at a time to a line scan camera. The arrangement also allows improved reading if a pair of data capture devices is scanned across a stationary media item or if a pair of data capture devices image stationary items.

Some bar codes, such as the USPS unique ID codes on the back of envelopes, Universal Postal Union (UPU) bar codes, and the new Royal Mail (United Kingdom) four state bar codes, utilize fluorescent inks rather than simple black inks. The advantage of the fluorescent inks is that their specific emission properties enable them to be detected against highly cluttered backgrounds because the incident light (e.g. ultraviolet light) is a different color than the emitted light of interest (e.g. red). This means that only the bar codes is observed rather than the image of the (non-fluorescent) item. The drawback is that fluorescent inks are well known to change their intensity of fluorescence through time due to aging of the pigments and settling out of active components in the ink. Therefore old ink may produce a weak fluorescence and degraded readability. Small bars with bright light may mimic tall bars with weak fluorescence; small bars with weak fluorescence may not be visible at all. The present invention provides a means to obtain better bar code data from marginal bar codes.

The need for increased data density in bar codes (to reduce print area or encode more information such as unique tracking or accounting information) has also led to more complex bar codes. A four state bar code can encode 4 times the data per bar as does a two state bar code. Current four state bar codes are similar to POSTNET bar codes except that they have 4 bar types (very tall, very short, ascending, and descending). Such bar codes are being adopted by USPS (black ink) and have been used for years by Royal Mail (United Kingdom) with black ink and recently have shifted to fluorescent inks as well. The issues discussed above relating to reading fluorescent inks in which variable ink intensity complicates the read process is especially significant as multiple bar types must be distinguished. Likewise, two dimensional bar codes, such as PDF417 utilize a matrix of bar code elements (typically on or off) with ever smaller elements which strain the ability of both printers and readers to successfully encode and decode information. The present invention provides a means to obtain better bar code data from marginal bar codes.

Data may be encoded in multiple bar codes, in text, in images, or in magnetic media. Data may also be encoded in Radio Frequency Identification (RFID) tags for point of sale, inventory, or tracking purposes. Multiple readers may be utilized to enhance the readability of such items and the positioning of these readers to maximize readability while minimizing data collisions and hardware costs may be guided by the approach of the present invention. The present arrangement provides a means to obtain better data from bar code readers, OCR, magnetic, and RFID devices. Moreover, it should be understood that the present arrangement can be utilized in the reading of single or plural bar codes, text, images, magnetic, electronic, or RFID data from various type items. While the system and methods are discussed in detail with regard to the illustrative case of USPS POSTNET bar codes moving past bar code readers but apply equally to the use of multiple readers scanning past stationary items or to readers and media items which are both stationary. While the method and system are described in detail with respect to single POSTNET bar codes on mail pieces, this is just one of many possible arrangements as noted above.

While the present invention has been described in connection with what is presently considered the most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. In a paper handling system a method for reading a bar code on a mail piece, wherein data in said bar code is representative of address information on said mail piece, the method comprising the steps of:
    transporting said mail piece such that said bar code on said mail piece moves past a first and a second bar code reader;
    said first and said second bar code reader each scanning said bar code on said mail piece to read said bar code; and,
    merging data obtained by said first and said second bar code reader to reconstruct said bar code on said mail piece; and
    employing said data obtained by said first and said second bar code reader to cause a camera to image a specific portion of said address information on said mail piece that represents bar code data not recovered by said first and said second bar code reader, such that merging said data obtained by said first and said second bar code reader with imaging data obtained from said mail piece address information reconstructs said bar code on said mail piece.

2. A method for reading bar codes as defined in claim 1 further including the step of positioning said first and said second bar code reader such that the maximum reading efficiency of said bar code on said mail piece by said first and said second bar code reader occurs at different points of said mail piece bar code for said first and said second bar code reader as said mail piece bar code is scanned by said first and said second bar code reader to facilitate the merging the data obtained by said first and said second bar code reader to reconstruct said bar code on said mail piece.

3. A method for reading bar codes as defined in claim 1 further including the step of positioning said first and said second bar code reader to maximize the reading degradation of said bar code on said mail piece by said first and said second bar code reader at different points for said first and said second bar code reader as said mail piece bar code is scanned by said first and said second bar code reader to facilitate the merging the data obtained by said first and said second bar code reader to reconstruct said bar code on said mail piece.

4. A method for reading bar codes as defined in claim 1 further including the step of positioning said first and said second bar code reader so that beat frequency degradation in reading said moving mail piece bar code occurs at a different point of said moving mail piece bar code in scanning said moving bar code by said first and said second bar code reader.

5. A method for reading bar codes as defined in claim 1 wherein said bar code is a POSTNET bar code.

6. A method for reading bar codes as defined in claim 1 wherein said bar code is a PLANET bar code.

7. A method for reading bar codes as defined in claim 1 wherein said bar code is a variable width bar code.

8. A method for reading bar codes as defined in claim 1 wherein said bar code is a tracking and tracing type bar code.

9. A method for reading bar codes as defined in claim 1 wherein said bar code is a two dimensional bar code.

10. A method for reading bar codes as defined in claim 1 wherein said bar code is a fluorescent bar code.

11. A method for reading bar codes as defined in claim 1 wherein said bar code is magnetic type bar code.

12. A method for reading bar codes as defined in claim 1 wherein plural codes are on said mail piece, the method further comprising the steps of:
    said first and said second bar code reader each scanning each of said plural codes on said mail piece to read said codes; and,
    merging the data obtained by said first and said second bar code reader to reconstruct each of said plural codes on said mail piece.

13. A method for reading bar codes as defined in claim 1 wherein said plural codes are a POSTNET bar code and a PLANET bar code.

14. In a sorting system having a plurality of sortation bins controlled by a sort control computer, a method for reading a POSTNET bar code on a mail piece, wherein data in said POSTNET bar code is representative of address information on said mail piece, the method comprising the steps of:
    transporting said mail piece such that said POSTNET bar code on said mail piece moves past a first and a second bar code reader;
    said first and said second bar code reader each scanning said POSTNET bar code on said mail piece to read said bar code;

merging data obtained by said first and said second bar code reader to reconstruct said POSTNET bar code on said mail piece;

employing said data obtained by said first and said second bar code reader to cause a camera to image a specific portion of said address information on said mail piece that represents POSTNET bar code data not recovered by said first and said second bar code reader, such that merging said data obtained by said first and said second bar code reader with imaging data obtained from said mail piece address information reconstructs said POSTNET bar code on said mail piece; and said sort control computer employing said reconstructed POSTNET bar code to cause said mail piece to be sorted into a specific one of said plurality of sortation bins.

15. A method for reading a POSTNET bar code as defined in claim 14 wherein at least one of said first bar code reader and said second bar code reader is adjusted to obtain complementary bar code scanning of said mail piece bar code to facilitate reconstruction of said POSTNET bar code on said mail piece.

16. A method for reading a POSTNET bar code as defined in claim 14 wherein at least one of said first bar code reader and said second bar code reader is adjusted to obtain complementary bar code scanning of said mail piece bar code to facilitate reconstruction of said POSTNET bar code on said mail piece by adjusting the spacing between the bar code readers.

17. A method for reading a POSTNET bar code as defined in claim 14 wherein at least one of said first bar code reader and said second bar code reader is adjusted to obtain complementary bar code scanning of said mail piece bar code to facilitate reconstruction of said POSTNET bar code on said mail piece by adjusting the skew orientations of the bar code readers with respect to each other.

18. A method for reading a POSTNET bar code as defined in claim 14, said mail piece further including a PLANET bar code, the method further comprising the steps of: said first and said second bar code reader each scanning each of said POSTNET bar code and said PLANET bar code on said mail piece to read said codes; and, merging the data obtained by said first and said second bar code reader to reconstruct each of said POSTNET bar code and PLANET bar code on said mail piece.

19. A paper handling system for mail pieces each having a bar code imprinted thereon, wherein data in said bar code is representative of address information on said mail piece, the system comprising:

a computer and a mail piece transport;

a first bar code reader and a second bar code reader, said first and said second bar code reader each connected to said computer, and mounted on said mail piece transport;

said transport moving mail pieces past said first and said second bar code reader, each reader operable to scan transported mail pieces to obtain bar code data for each mail piece bar code and communicate obtained bar code data to said computer;

said computer operable to merge the data obtained by said first and said second bar code reader to reconstruct the bar code on a mail piece; and a camera imaging, in response to said data obtained by said first and said second bar code reader, a specific portion of said address information on said mail piece that represents bar code data not recovered by said first and said second bar code reader, such that merging said data obtained by said first and said second bar code reader with imaging data obtained from said mail piece address information reconstructs said bar code on said mail piece.

20. A paper handling system for mail pieces as defined in claim 19 wherein said first and said second bar code reader are mounted on said transport such that the distance between said bar code readers is adjustable.

21. A paper handling system for mail pieces as defined in claim 19 wherein said first and said second bar code reader are mounted on said transport such that the angular orientation between said bar code readers is adjustable.

* * * * *